(12) United States Patent
Lange et al.

(10) Patent No.: US 10,059,289 B2
(45) Date of Patent: Aug. 28, 2018

(54) IMPACT-ABSORBING STRUCTURE FOR A MOTOR VEHICLE

(71) Applicant: CONSTELLIUM SINGEN GMBH, Singen (DE)

(72) Inventors: Christian Lange, Löhningen (CH); Olivier Rebuffet, Grenoble (FR); Franck Kopec, Versailles (FR); Frédéric Coiffier, Leuville sur Orge (FR); Alexandre Terrillon, Chàtillon-le-Duc (FR)

(73) Assignee: CONSTELLIUM SINGEN GMBH, Singen (DE)

( * ) Notice: Subject to any disclaimer, the term of this patent is extended or adjusted under 35 U.S.C. 154(b) by 0 days.

(21) Appl. No.: 15/035,866

(22) PCT Filed: Dec. 4, 2014

(86) PCT No.: PCT/IB2014/003200
§ 371 (c)(1),
(2) Date: May 11, 2016

(87) PCT Pub. No.: WO2015/083011
PCT Pub. Date: Jun. 11, 2015

(65) Prior Publication Data
US 2017/0210318 A1    Jul. 27, 2017

(30) Foreign Application Priority Data
Dec. 6, 2013 (FR) .................................... 13 02847

(51) Int. Cl.
*B62D 21/15* (2006.01)
*B60R 19/34* (2006.01)
(Continued)

(52) U.S. Cl.
CPC .............. *B60R 19/34* (2013.01); *B60R 19/18* (2013.01); *B62D 21/152* (2013.01); *B62D 25/082* (2013.01)

(58) Field of Classification Search
CPC ........ B60R 19/34; B60R 19/18; B62D 21/152
(Continued)

(56) References Cited

U.S. PATENT DOCUMENTS 6,003,930 A    12/1999   Frank et al.
6,258,465 B1    7/2001   Oka et al.
(Continued)

FOREIGN PATENT DOCUMENTS

DE        102005021663 B3 *   5/2006       B60R 19/34
DE   10 2006 038 674 A1    2/2008
(Continued)

OTHER PUBLICATIONS

Machine translation of DE 102009033945 A1 (Year: 2011).*
(Continued)

*Primary Examiner* — Hilary L Gutman
(74) *Attorney, Agent, or Firm* — Ladas & Parry LLP; Malcolm J. MacDonald

(57) ABSTRACT

The invention relates to an impact-absorbing structure for a vehicle, the structure of which comprises at least one side rail for supporting a bumper crossbeam, the side rail being a hollow profile member arranged according to the longitudinal axis of the vehicle, the impact-absorbing structure including the bumper crossbeam, at least one absorber placed between the side rail and the bumper crossbeam, the absorber being a hollow profile member intended for deforming in the event of an impact, one end of the profile member being intended to be inserted into the open end of the side rail, the end of the profile member being attached to the side rail via transversely arranged attachment means, and
(Continued)

an attachment insert provided with opposing surfaces. Each of the opposing surfaces of the insert is provided with two transverse recesses arranged perpendicular to the opposing surfaces, and offset relative to one another.

15 Claims, 2 Drawing Sheets

(51) Int. Cl.
    *B62D 25/08*    (2006.01)
    *B60R 19/18*    (2006.01)

(58) Field of Classification Search
    USPC ..................................................... 296/187.1
    See application file for complete search history.

(56) References Cited

U.S. PATENT DOCUMENTS

| | | | |
|---|---|---|---|
| 6,282,769 B1 * | 9/2001 | Longo | B60R 19/26 29/412 |
| 7,188,877 B2 * | 3/2007 | Gonzalez | B60R 19/34 293/133 |
| 7,401,825 B2 * | 7/2008 | Frank | B60R 19/24 293/133 |
| 7,926,868 B2 * | 4/2011 | Braunbeck | B60R 19/34 293/132 |
| 8,020,907 B2 * | 9/2011 | Wibbeke | B60R 19/24 293/133 |
| 8,177,269 B2 * | 5/2012 | Braunbeck | B60R 19/34 293/132 |
| 8,454,064 B2 * | 6/2013 | Frank | B60R 19/34 293/133 |
| 8,632,108 B2 * | 1/2014 | Matuschek | B62D 21/152 293/133 |
| 9,102,289 B2 * | 8/2015 | Braunbeck | B60R 19/34 |
| 9,283,909 B2 * | 3/2016 | Rottger | B60R 19/26 |
| 9,566,924 B2 * | 2/2017 | Nakanishi | B60R 19/34 |
| 2001/0037844 A1 | 11/2001 | Bekki et al. | |
| 2002/0113447 A1 | 8/2002 | Frank | |
| 2003/0207143 A1 | 11/2003 | Kawai et al. | |
| 2004/0201254 A1 | 10/2004 | Liebhard et al. | |
| 2008/0106107 A1 * | 5/2008 | Tan | B60R 19/34 293/133 |
| 2008/0238142 A1 * | 10/2008 | Braunbeck | B60R 19/34 296/187.03 |
| 2010/0019518 A1 * | 1/2010 | Stewart | B60R 19/34 293/133 |
| 2010/0148527 A1 * | 6/2010 | Frank | B60R 19/34 293/155 |
| 2010/0230983 A1 * | 9/2010 | Braunbeck | B60R 19/34 293/133 |
| 2011/0089707 A1 * | 4/2011 | Perarnau Ramos | B60R 19/34 293/132 |
| 2013/0119682 A1 * | 5/2013 | Matuschek | B60R 19/34 293/133 |

FOREIGN PATENT DOCUMENTS

| | | | | |
|---|---|---|---|---|
| DE | 10 2007 011 385 A1 | | 9/2008 | |
| DE | 102008012623 A1 | * | 9/2009 | ............ B60R 19/34 |
| DE | 102009033945 A1 | * | 2/2011 | ............ B60R 19/24 |
| DE | 10 2012 007 233 A1 | | 11/2012 | |
| DE | 102011117933 A1 | * | 5/2013 | ........... B62D 21/152 |
| DE | 102009034094 B4 | * | 4/2014 | ............ B60R 19/34 |
| DE | 102012024978 A1 | * | 6/2014 | ............ B60R 19/34 |
| EP | 0 734 908 A2 | | 10/1996 | |
| EP | 0 894 575 A2 | | 2/1999 | |
| EP | 1 041 165 A1 | | 10/2000 | |
| EP | 1 688 312 A1 | | 8/2006 | |
| EP | 1 717 107 A1 | | 11/2006 | |
| EP | 1 977 935 A2 | | 10/2008 | |
| GB | 2 304 651 A | | 3/1997 | |
| WO | 97/03865 A1 | | 2/1997 | |
| WO | WO-2008019788 A1 | * | 2/2008 | ............ B60R 19/24 |

OTHER PUBLICATIONS

Non-English Search Report dated May 14, 2014 for Application No. FR 1302847.
Espacenet English abstract of DE 10 2012 007 233 A1.
Espacenet English abstract of EP 1 977 935 A2.
Espacenet English abstract of DE 10 2007 011 385 A1.
Espacenet English abstract of EP 1 688 312 A1.
Espacenet English abstract of EP 0 734 908 A2.
Espacenet English abstract of EP 0 894 575 A2.
Espacenet English abstract of EP 1 717 107 A1.

\* cited by examiner

IMPACT-ABSORBING STRUCTURE FOR A MOTOR VEHICLE

This application is a 371 of PCT/IB2014/003200 filed on Dec. 4, 2014, which claims priority to French application number 13/02847, filed on Dec. 6, 2013.

SUMMARY OF THE INVENTION

The invention relates to an impact-absorbing device, more particularly the means for attaching said impact-absorbing device to the structure (front or rear) of a motor vehicle. This typically includes two side rails forming a shaft, each side rail generally consisting of a part welded along the entire length thereof and serving as a support for a bumper beam. In the impact-absorbing devices concerned by the invention, an impact absorber, also known as a "crash-box", is inserted between the ends of each side rail and the bumper beam, in order to protect the shaft in the event of a low-speed impact. The crash-box is herein a deformable part associated with the bumper crossbeam to form a low-speed impact-absorbing device, also known as a "Crash Management System" (CMS).

BACKGROUND OF THE INVENTION

In practice, in the event of a frontal impact at a speed less than four kilometers/hour, the bumper and the crash-boxes are deformed in the elastic range and return to the initial position thereof without damage. In the event of an impact at a speed greater than four kilometers/hour, the bumper and the crash-boxes are subject to plastic deformation which makes it possible to at least partially absorb the energy from the impact. When the impact occurs at a speed remaining below approximately fifteen kilometers/hour, the energy absorbed makes it possible to protect the rest of the structure of the vehicle (reparability threshold). Beyond this, in the event of impacts at a speed above fifteen kilometers/hour, the structure of the shaft is damaged and the resulting repair costs are high.

Through numerous prior art documents, such as U.S. Pat. No. 6,003,930, US2004/0201254, U.S. Pat. No. 6,258,465, EP 1 041 165, EP 1 688 312, US2003/0207143, US2001/0037844, crash-boxes are known which have an elongated profiled portion in the longitudinal direction which is deformed by successive folding under the effect of the compression force generated by the impact. This deformation mode, referred to as "progressive folding", is the result of a set of micro-instabilities giving rise to local bending of the longitudinal walls of the profiled portion, which are deformed plastically, causing regularly distributed lobes to appear. Advantageously, the profiled portion is an extruded profile member, typically made of aluminum alloy, the cross-section whereof is designed such that progressive folding can occur along the entire effective length of said profiled portion and absorbs a large proportion of the kinetic energy. The shape and thickness of the profile cross-section, the type of extruded alloy are chosen to obtain regular progressive folding preventing a major instability, such as buckling, from resulting in the sudden formation of a swivel joint (swiveling) whereby the profile is rapidly folded and crushed before being able to absorb all the intended amount of kinetic energy.

"Crash test" protocols have been defined by motor vehicle manufacturers and insurance companies to improve the safety conditions applied to vehicles. Initially, these tests simulated frontal impacts, i.e. impacts giving rise to perfectly longitudinal forces. Recently, these "crash tests", notably Euro-NCAP or RCAR, follow a protocol (see for example "RCAR Low-speed structural crash test protocol"—Issue 2.2 Jul. 2011) wherein the impact is no longer perfectly frontal but offset: as illustrated in FIG. 1, the vehicle (1) undergoing the test is projected against a wall (2) placed on the driver's side such that it offers an obstacle over more than 40% of the width of the vehicle (U>0.4*B) and forms an angle (α) of 10° with respect to the perpendicular (P) to the longitudinal axis (L) of the vehicle.

The new EuroNCAP and RCAR impact test protocols apply impacts which are not merely frontal but involve the presence of transverse forces and torques acting on the absorber. The new conditions of these tests increase the risk of elastic instability such as buckling of the absorber. When the buckling results in pivoting of the absorber in a horizontal plane, the term "skewing" is used. When the buckling results in pivoting of the absorber in a vertical plane, the term "verticalization" is used.

In general, as illustrated in numerous documents, such as GB2304651, EP0734908, WO97/03865, EP0894575, US2002/0113447, U.S. Pat. No. 6,003,930 and EP1688312, the end of the absorber is provided with a transverse plate, which is attached to a transverse plate rigidly connected to the structure (front or rear) of the vehicle. The European patent application EP 1 717 107 differs from the prior art by describing an absorber which is attached to a side rail after having been partially inserted into the recess of said side rail, which is presented in the form of a hollow profile member. The absorber has a first end whereon the bumper crossbeam is attached and a second end which is inserted into the recess of the side rail. Once inserted along a length E0 substantially equal to a characteristic dimension of the cross-section of the absorber, for example the diameter of the circumscribed circle of said cross-section, this second end is attached to the side rail with attachment means which secure the longitudinal walls facing the crash-box and the side rail. These attachment means are typically bolts through said facing longitudinal walls of the crash-box and the side rail.

Inserting the end of the absorber inside the side rail, as proposed in EP 1 717 107, has the advantage over prior solutions, which consisted of attaching the absorber to the side rail using a transverse plate, of reducing the risk of buckling of the absorber in the event of impact. However, tests have progressed and have become more severe, by introducing lateral and/or dissymmetric forces during the impact. These forces significantly increase the risk of skewing and verticalization of the crash-box in the event of an impact.

The aim of the present invention is that of finding conditions for attaching such an absorber which make it possible to substantially reduce the risks of skewing and verticalization, in particular in the event of impacts involving lateral forces.

The invention firstly relates to an impact-absorbing structure for a vehicle, the structure of which comprises at least one side rail intended to support a bumper crossbeam, said side rail being a hollow profile member arranged according to the longitudinal axis of said vehicle and having at least two opposing longitudinal walls, said impact-absorbing structure comprising:

a. said bumper crossbeam;

b. at least one absorber placed between said side rail and said bumper crossbeam, said absorber being a hollow profile member intended to be deformed in the event of an impact, having at least two opposing longitudinal walls, one end of said profile member being intended to be inserted into the open end of said side rail such that said opposing longitudinal walls of said absorber are arranged facing and in the vicinity of said opposite longitudinal walls of the side rail, said end of said profile member being attached to said side rail using attachment means, typically assemblies of bolts+ nuts, arranged transversely, perpendicular to said opposing longitudinal walls of the absorber and the side rail, c. an attachment insert provided with opposing surfaces which, when said attachment insert is inserted into said absorber, are arranged facing and in the vicinity of said opposing longitudinal walls of the absorber, characterized in that each of said opposing surfaces of the insert is provided with two transverse recesses arranged perpendicular to said opposing surfaces, intended to engage with said attachment means, and offset relative to one another both in the longitudinal direction and in the transverse direction perpendicular to the direction of the axis of said transverse recesses.

In general, the front structure of a motor vehicle comprises a shaft including two side rails supporting a bumper crossbeam together. The impact-absorbing structure or CMS results from the assembly of said bumper crossbeam and two absorbers serving as intermediate elements between the bumper crossbeam and the side rails. The impact-absorbing structure is positioned on the front (or rear) structure of the vehicle such that each absorber is inserted between a side rail and said bumper crossbeam. The absorber is thus both an element whereby the bumper crossbeam is attached to the front structure of the vehicle and a deformable element designed to absorb a certain quantity of kinetic energy in the event of impact.

The absorber used within the scope of the invention is a hollow profile member similar to that described in EP 1 717 107, having opposing longitudinal walls which, when it is inserted into the side rail, are situated facing and in the vicinity of opposing longitudinal walls of said side rail. When it is attached to the front (or rear) structure of the vehicle, it is arranged along the longitudinal axis of said side rail, one of the ends thereof being inserted into the open end of said side rail and attached thereto using attachment means, typically screws or bolts provided with nuts which are arranged transversely, perpendicular to said facing longitudinal walls of the absorber and the side rail. Said facing longitudinal walls of the absorber and the side rail are placed in contact and secured by screwing or by fastening nuts on bolts through both ends of the side rail and the absorber.

According to the invention, the impact-absorbing structure also comprises an attachment insert intended to be inserted into the absorber with a view to engaging with said attachment means. For this purpose, the insert comprises two opposing surfaces, which, when the insert is inserted into the absorber, are situated facing and in the vicinity of opposing longitudinal walls of said absorber. These opposing surfaces are intended to serve as internal bearing members against which the opposing longitudinal walls of the absorber abut, the latter being driven, with the opposing longitudinal walls of the side rail, towards said bearing members when nuts are fastened onto said bolts.

According to the invention, each of the opposing surfaces of the insert is provided with two transverse recesses arranged perpendicular to said opposing surfaces, intended to engage with said attachment means, and offset relative to one another both in the longitudinal direction and in the transverse direction perpendicular to the direction of the axis of said transverse recesses. These transverse recesses are either recesses provided with a screwing thread, or bores intended for the insertion of bolts through either side of the side rail, the absorber and the insert. Preferably, the transverse recesses of one of the opposing surfaces are aligned with the transverse recesses of the other opposing surface. In some embodiments of the invention, the aligned transverse recesses join to form a bore through the insert from one or the other of the opposing surfaces.

The number and arrangement of the transverse recesses on each of the opposing surfaces of the insert, which determines the spatial arrangement of the attachment means, is an important parameter influencing the buckling strength of the absorber, in particular in the event of offset impacts. If, as in some embodiments of EP 1 717 107, a plurality of inserts are used, each of these inserts being provided with a single transverse recess, it is observed that, despite the support role played by the inserts, the risk of verticalization or skewing remains high. This is probably linked, at least in part, to the fact that each insert has independent behavior.

When using, not a plurality of inserts as in EP 1 717 107, but a single insert provided with said transverse recesses, superior results are obtained, but these are only significantly superior if the plane defined by the axes of the transverse recesses of each surface is neither parallel nor perpendicular to the longitudinal direction. With reference to FIG. 3$a$, where E denotes the component along the longitudinal direction (L) of the offset between the two transverse recesses and V denotes the component of the same offset along the transverse direction (Z) perpendicular to the direction (Y) of the axis of the transverse recesses, E and V must be strictly greater than 0. Preferably, these components are the greatest possible, compatible with the geometric constraints applied.

Advantageously, the penetration length $E0$ of the end of the absorber in the side rail is at least equal to a characteristic dimension of the cross-section of the absorber, for example the radius of the circumscribed circle of said cross-section or half the greatest dimension of said cross-section (half of the length thereof if it is substantially rectangular). The component E along the longitudinal direction of the offset between the two transverse recesses of the insert is preferably greater than $E0/4$, more preferably greater than $E0/3$.

Preferably, said opposing longitudinal walls of the absorber are associated with the greatest dimension $V0$ of the cross-section of said absorber to maximize the contact surface area between the opposing walls of the side rail and the opposing walls of the absorber. Under these conditions, the transverse direction perpendicular to the axis of the transverse recesses is the direction of the greatest dimension of the cross-section. The component V along the transverse direction perpendicular to the axis of the transverse recesses of the offset between the two transverse recesses of the insert is preferably greater than $V0/4$, more preferably greater than $V0/2$. As stated above, $E0$ is preferably greater than $V0/2$, such that the component E along the longitudinal direction of the offset between the two transverse recesses of the insert is preferably greater than $V0/8$, more preferably greater than $V0/6$.

In the preferred embodiments of the invention, the greatest dimension $V0$ of the cross-section of the absorber is arranged vertically and said opposing longitudinal walls of the absorber are vertical walls extending along a height substantially equal to the overall height ($H0$) of the absorber. In this case, the direction of the axis of the transverse recesses is horizontal and perpendicular to the longitudinal direction. The penetration $E0$ being preferably greater than $H0/2$, the component along the longitudinal direction of the offset between the two transverse recesses of the insert is preferably greater than $H0/8$, more preferably greater than H0/6, or H0/4. Advantageously, the component along the vertical transverse direction (which is perpendicular to the horizontal direction of the axis of the transverse recesses) of the offset between the two transverse recesses of the insert is greater than H0/4, more preferably H0/2.

In the embodiments described hereinafter, the transverse recesses of one of the opposing surfaces are aligned with the transverse recesses of the other opposing surface. These are either recesses provided with a screwing thread intended to engage with screws, or bores intended for the insertion of bolts through either side of the side rail, the absorber and the insert.

In a first embodiment, the insert comprises solid areas surrounding said transverse recesses, extending from one of said opposing surfaces to the other and which are interconnected by a thin wall. The absorber is a hollow profile member which comprises three chambers separated from one another by two horizontal internal partitions. The thin wall of the insert has an inverted U shape wherein the branches are not equal, which comprises two horizontal wall portions interconnected by a vertical wall portion. Following the insertion of the insert into the absorber, the horizontal wall portions are arranged facing said horizontal internal partitions such that the thin U-shaped wall overlaps with the two horizontal internal partitions of the absorber and the insert is inserted until the vertical portion comes to a stop against said partitions. The absorber is attached to the side rail either by screwing (the transverse recesses are in this case recesses provided with a screwing thread) or by bolting (the transverse recesses are in this case through bores for inserting the bolts through the side rail-absorber-insert assembly). As such, a stable assembly is obtained, whereby the attachment of the absorber onto the side rail provides conditions similar to those of flush fitting, making it possible to reduce the risks of skewing and verticalization of said absorber in the event of a deflected impact.

In a second embodiment, the insert comprises two opposing solid areas, each solid area comprising one of said opposing surfaces. The transverse recesses are either recesses provided with a screwing thread, or bores aligned each passing through one of said solid areas. The absorber is attached to the side rail either by screwing or by bolting. A stable assembly is also obtained making it possible to substantially reduce the risks of skewing and verticalization of said absorber in the event of a deflected impact.

DETAILED DESCRIPTION EMBODIMENTS OF THE INVENTION

Figure 1:
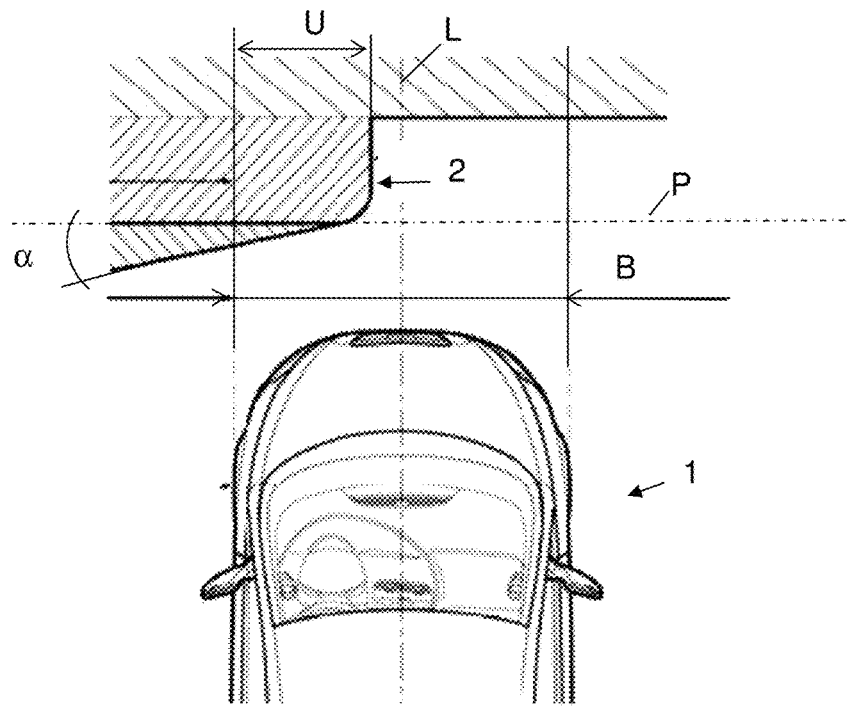
FIG. 1 illustrates a top view representing the test conditions relative to an offset, substantially frontal impact test (figure taken from "RCAR Low-speed structural crash test protocol (Appendix I)").
Figure 2:
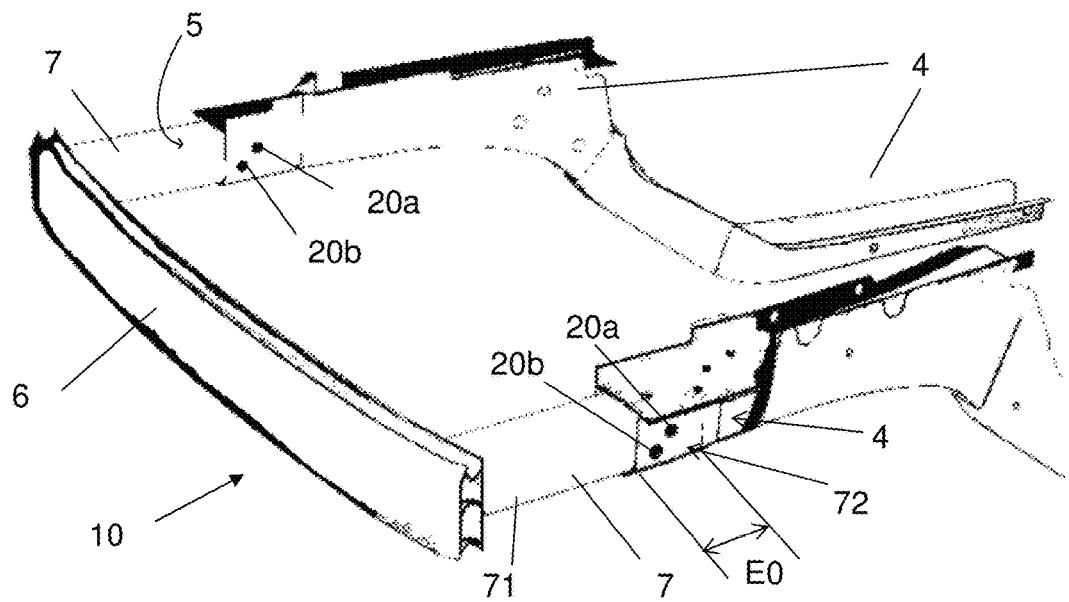
FIG. 2 represents a perspective view of a front vehicle structure equipped with an impact-absorbing structure according to the invention.
Figure 3:
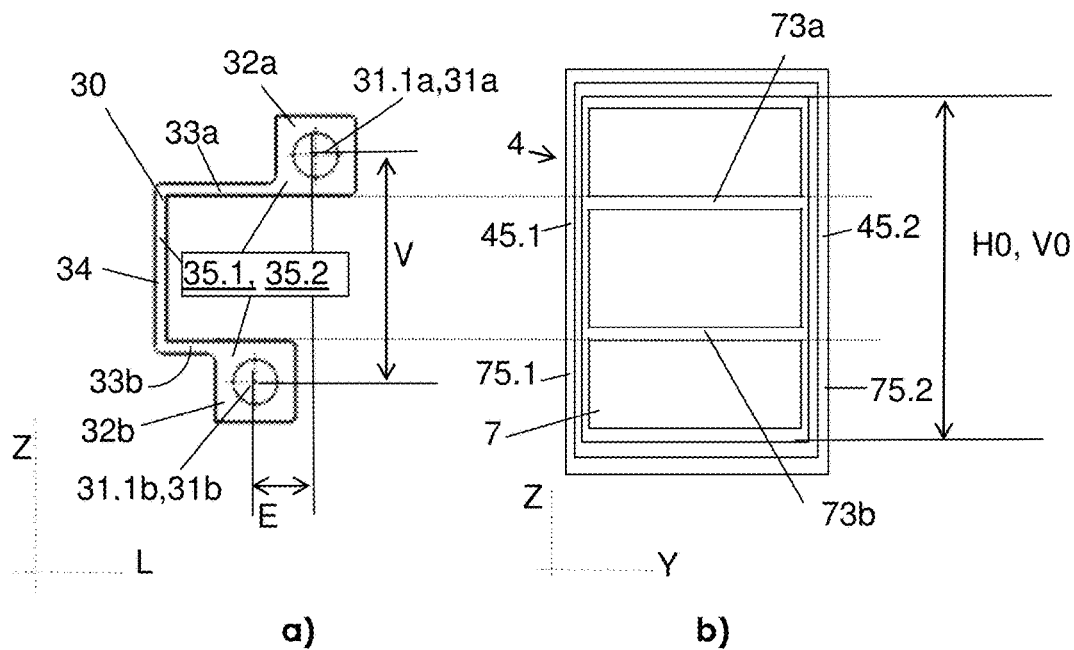
FIG. 3a represents a first embodiment of the insert used in the impact-absorbing structure according to the invention, the insert being viewed along the transverse direction of the recesses.
FIG. 3b represents the cross-section of the side rail and the absorber wherein the insert illustrated in 3a is intended to be inserted.
Figure 4:
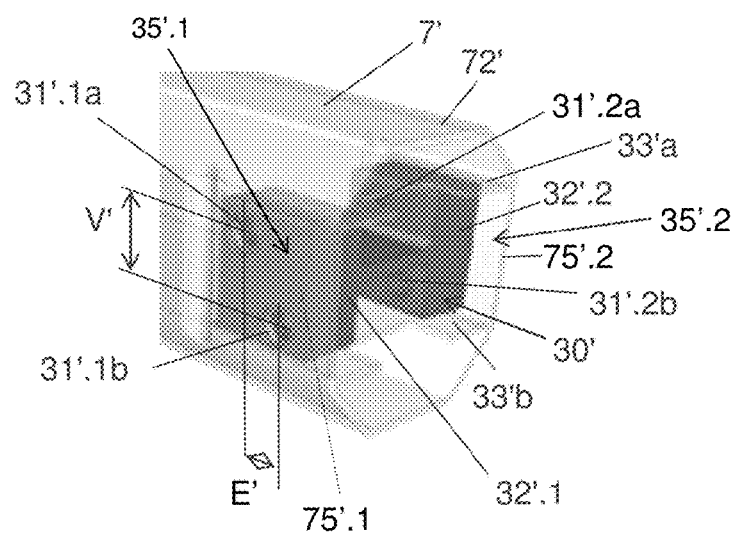
FIG. 4 represents a second embodiment of the insert used in the impact-absorbing structure according to the invention.

The front vehicle structure illustrated in FIG. 2 comprises a particular embodiment of the impact-absorbing structure (10) according to the invention. It comprises a shaft (2) including two side rails (4) supporting a bumper crossbeam (6) together. The impact-absorbing structure or CMS results from the assembly of said bumper crossbeam and two absorbers (7). It is positioned on the front structure of the vehicle such that each absorber is inserted between a side rail and said bumper crossbeam.

The absorber is a profile member wherein one end is rigidly connected to the bumper crossbeam and the other end (72) is inserted into the open end (5) of the side rail (4) along a length E0, at least equal to the greatest dimension of the cross-section of the absorber. The profile member has a useable portion (71), which is not inserted into said side rail or into said bumper crossbeam and which is intended to fold progressively under the effect of a substantially frontal impact.

After insertion, said end (72) is attached thereto using horizontal bolts (20a, 20b) through either side of the side rail and the absorber.

EXAMPLE 1 (FIG. 3)

The side rail (4) is a hollow profile member having two opposing vertical longitudinal walls (45.1 and 45.2).

The absorber (7) is an extruded profile member having two opposing vertical longitudinal walls (75.1 and 75.2). The cross-section thereof has a rectangular outer shape, wherein the greatest dimension V0 corresponds to the height H0. When the end (72) of the absorber (7) is inserted into the open end of the side rail, the opposing longitudinal walls (75.1 and 75.2) of the absorber are arranged respectively facing and in the vicinity of said opposing longitudinal walls (45.1 and 45.2) of the side rail.

The attachment insert (30) is provided with opposing surfaces (35.1 and 35.2) which, when said attachment insert is inserted into the absorber (7), are arranged respectively facing and in the vicinity of the opposing longitudinal walls (75.1 and 75.2) of the absorber.

Each surface of the insert (30) is provided with two transverse recesses (31.1a, 31.1b) aligned with the transverse recesses of the other surfaces and joined thereto to form through bores (31a) and (31b) intended to act as a guide for bolts passing through either side thereof. These recesses are arranged perpendicular to the opposing surfaces (35.1 and 35.2). They are offset relative to one another both in the longitudinal direction (L) and in the vertical direction (Z), which is in the transverse direction perpendicular to the direction (Y) of the axis of said transverse recesses.

The end (72) of the absorber (7) has been inserted into the recess (5) of the side rail (2) along a length corresponding to 2*H0/0.3. The component E along the longitudinal direction of the offset between the two transverse recesses (31.1a) and (31.1b) of the insert (30) is equal to 0.17*H0. The component V along the vertical direction (transverse direction perpendicular to the axis of the transverse recesses) of the offset between the two transverse recesses (31a) and (31b) of the insert (30) is equal to 2*H0/3.

The insert (30) comprises solid areas (32a, 32b) extending around the transverse bores (31a, 31b) along the entire length thereof and which are interconnected by a thin wall (33a+34+33b). The absorber is a hollow profile member which comprises three chambers separated from one another by two horizontal internal partitions (73a and 73b).

The thin wall of the insert has an inverted U shape wherein the branches are not equal, which comprises two horizontal wall portions (33a and 33b) interconnected by a vertical wall portion (34). Following the insertion of the insert (30) into the absorber (7), the horizontal wall portions (33a and 33b) are arranged facing said horizontal internal partitions (73a and 73b) such that the thin U-shaped wall overlaps with the two horizontal internal partitions of the absorber. The insert (30) is inserted until the vertical portion (34) comes to a stop against said partitions. By pinching slightly, i.e. rendering the horizontal wall portions (33a and 33b) slightly convergent, the insert (30), once inserted into the absorber (7), can be held in position on the end (72) of the absorber (7).

In order to attach the absorber (7) to the side rail (4), bolts (20a and 20b) pass through either side of said side rail and said absorber via said transverse bores (31a, 31b). When the nuts are fastened on the bolts, the facing opposing longitudinal walls of the absorber (75.1 and 75.2) and the side rail (45.1 and 45.2) are placed in contact and driven to the opposing surfaces (35.1 and 35.2) of the insert, which act as an abutment and a counter-bearing member. The attachment may be completed by the use of non-through vertical screws. As such, a stable assembly is obtained, which provides conditions similar to those of flush fitting, making it possible to reduce the risks of skewing and verticalization of said absorber in the event of an offset impact.

EXAMPLE 2 (FIG. 4)

The absorber (7') is an extruded profile member with an octagonal cross-section having two opposing vertical longitudinal walls (75'.1 and 75'.2).

The insert (30') comprises two opposing solid areas (32'.1 and 32'.2), each solid area (32'.1, or 32'.2) comprising one of the opposing surfaces (35'.1, or 35'.2). The opposing surfaces (35'.1 and 35'.2), when said attachment insert is inserted into the absorber (7') are arranged respectively facing and in the vicinity of the opposing longitudinal walls (75'.1 and 75'.2) of the absorber.

Each surface (35'.1, 35'.2) of the insert (30') is provided with two transverse recesses (31'.1a, 31'.1b) aligned with the transverse recesses (31'.2a, 31'.2b) of the other surface, forming two pairs of bores intended to act as a guide for bolts through either side thereof. These transverse recesses are arranged perpendicular to the opposing surfaces (35'.1 and 35'.2). They are offset relative to one another in the longitudinal direction and in the vertical direction, which is the transverse direction perpendicular to the direction of the axis of said transverse recesses.

If H0 denotes the overall height of the cross-section of the absorber (7'), the component V' along the vertical direction (transverse direction perpendicular to the axis of the transverse recesses) of the offset between the two transverse recesses is equal to 0.3*H0. The component E' along the longitudinal direction of the offset between the two transverse cavities is equal to H0/8.

The invention claimed is:

1. An impact-absorbing structure for a vehicle, the structure comprising:
   at least one side rail configured to support a bumper crossbeam, said side rail being a hollow profile member arranged according to the longitudinal axis of said vehicle and having at least two opposing longitudinal walls, said impact-absorbing structure comprising:
   said bumper crossbeam;
   at least one absorber placed between said side rail and said bumper crossbeam, said absorber being a hollow profile member that deforms in the event of an impact, having at least two opposing longitudinal walls, one end of said profile member being configured to be inserted into the open end of said side rail such that said opposing longitudinal walls of said absorber are arranged facing, and in the vicinity of, said opposite longitudinal walls of the side rail, said end of said profile member being attached to said side rail using attachment means arranged transversely, perpendicular to said opposing longitudinal walls of the absorber and the side rail, and
   an attachment insert having opposing surfaces which, when said attachment insert is inserted into said absorber, are arranged facing, and in the vicinity of, said opposing longitudinal walls of the absorber,
   wherein each of said opposing surfaces of the insert consists of two transverse recesses arranged perpendicular to said opposing surfaces, said two transverse recesses being configured to engage with said attachment means, said two transverse recesses being offset relative to one another both in the longitudinal direction and in the transverse direction perpendicular to the direction of the axis of said transverse recesses; and
   wherein the insert comprises solid areas surrounding said transverse recesses, extending from one of said opposing surfaces to the other, and which are interconnected by a U-shaped wall which comprises two horizontal wall portions interconnected by a vertical wall portion.

2. The impact-absorbing structure according to claim 1, wherein said transverse recesses are either recesses having a screwing thread, or bores configured for the insertion of bolts through either side of the side rail, the absorber, and the insert.

3. The impact-absorbing structure according to claim 1, wherein the transverse recesses of one of said opposing surfaces are aligned with the transverse recesses of the other of said opposing surfaces.

4. The impact-absorbing structure according to claim 3, wherein said aligned transverse recesses join to form a bore through the insert from one or the other of the opposing surfaces.

5. The impact-absorbing structure according to claim 1, wherein the cross-section of said absorber has a greatest dimension V0, wherein the distance E of the offset along the longitudinal direction between said transverse recesses of said insert is greater than E0/3, where E0 is the penetration length of the end of the absorber into the side rail, which is at least equal to half of said greatest dimension V0.

6. The impact-absorbing structure according to claim 5, wherein the transverse direction perpendicular to the axis of the transverse recesses is the direction of the greatest dimension V0 of the cross-section, and wherein the distance V along the transverse direction perpendicular to the axis of the transverse recesses of the offset between the two transverse recesses of the insert is greater than V0/2.

7. The impact-absorbing structure according to claim 1, wherein said opposing longitudinal walls of the absorber are vertical and where the greatest dimension V0 of the cross-section of the absorber is the height H0, wherein the distance E along the longitudinal direction of the offset between the two transverse recesses of the insert is greater than H0/6, and wherein the distance V along the vertical direction of the offset between said two transverse recesses of the insert is greater than H0/2.

8. The impact-absorbing structure according to claim 7, wherein the insert comprises two opposing solid areas, each solid area comprising one of said opposing surfaces.

9. The impact-absorbing structure according to claim 5, wherein the distance E of the offset along the longitudinal direction between said transverse cavities of said insert is greater than E0/4.

10. The impact-absorbing structure according to claim 6, wherein the distance V along the transverse direction perpendicular to the axis of the transverse recesses of the offset between the two transverse recesses of the insert is greater than V0/4.

11. The impact-absorbing structure according to claim 7, wherein the distance E along the longitudinal direction of the offset between the two transverse recesses of the insert is greater than H0/6, and wherein the distance V along the vertical direction of the offset between said two transverse recesses of the insert is greater than H0/4.

12. The impact-absorbing structure according to claim 7, wherein the distance E along the longitudinal direction of the offset between the two transverse recesses of the insert is greater than H0/8, and wherein the distance V along the vertical direction of the offset between said two transverse recesses of the insert is greater than H0/4.

13. The impact-absorbing structure according to claim 7, wherein the distance E along the longitudinal direction of the offset between the two transverse recesses of the insert is greater than H0/8, and wherein the distance V along the vertical direction of the offset between said two transverse recesses of the insert is greater than H0/2.

14. The impact-absorbing structure according to claim 1, wherein said two horizontal wall portions are of unequal length.

15. An impact-absorbing structure for a vehicle, the structure comprising:
  at least one side rail configured to support a bumper crossbeam, said side rail being a hollow profile member arranged according to the longitudinal axis of said vehicle and having at least two opposing longitudinal walls, said impact-absorbing structure comprising:
  said bumper crossbeam;
  at least one absorber placed between said side rail and said bumper crossbeam, said absorber being a hollow profile member that deforms in the event of an impact, having at least two opposing longitudinal walls, one end of said profile member being configured to be inserted into the open end of said side rail such that said opposing longitudinal walls of said absorber are arranged facing, and in the vicinity of, said opposite longitudinal walls of the side rail, said end of said profile member being attached to said side rail using attachment means arranged transversely, perpendicular to said opposing longitudinal walls of the absorber and the side rail, and
  an attachment insert having opposing surfaces which, when said attachment insert is inserted into said absorber, are arranged facing, and in the vicinity of, said opposing longitudinal walls of the absorber,
  wherein each of said opposing surfaces of the insert consists of two transverse recesses arranged perpendicular to said opposing surfaces, said two transverse recesses being configured to engage with said attachment means, said two transverse recesses being offset relative to one another both in the longitudinal direction and in the transverse direction perpendicular to the direction of the axis of said transverse recesses; and
  wherein the absorber is a hollow profile member which comprises three chambers separated from one another by two horizontal internal partitions, wherein the insert comprises solid areas surrounding said transverse recesses, extending from one of said opposing surfaces to the other and which are interconnected by a U-shaped wall which comprises two horizontal wall portions interconnected by a vertical wall portion and wherein, following the insertion of the insert into the absorber, said horizontal wall portions are arranged facing said horizontal internal partitions such that said U-shaped wall overlaps with the two horizontal internal partitions of the absorber, said insert being inserted until the vertical portion comes to a stop against said horizontal internal partitions.

* * * * *